Figure 1:
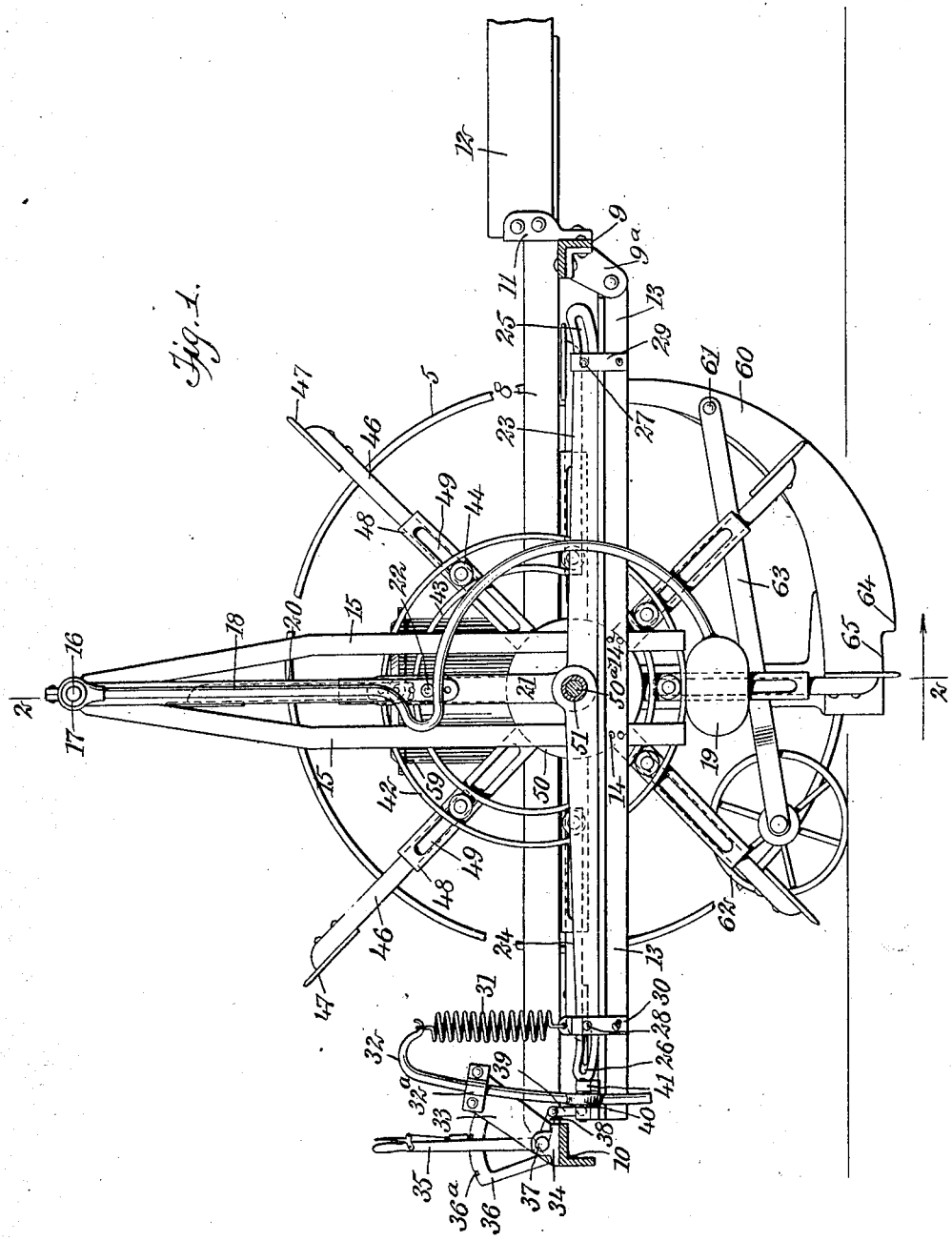

O. BROWN.
CHECK ROW PLANTER.
APPLICATION FILED SEPT. 16, 1908.

913,466.

Patented Feb. 23, 1909.
4 SHEETS—SHEET 1.

WITNESSES

INVENTOR
Otto Brown
BY
ATTORNEYS

O. BROWN.
CHECK ROW PLANTER.
APPLICATION FILED SEPT. 16, 1908.

913,466.

Patented Feb. 23, 1909.
4 SHEETS—SHEET 2.

WITNESSES

INVENTOR
Otto Brown
BY
ATTORNEYS

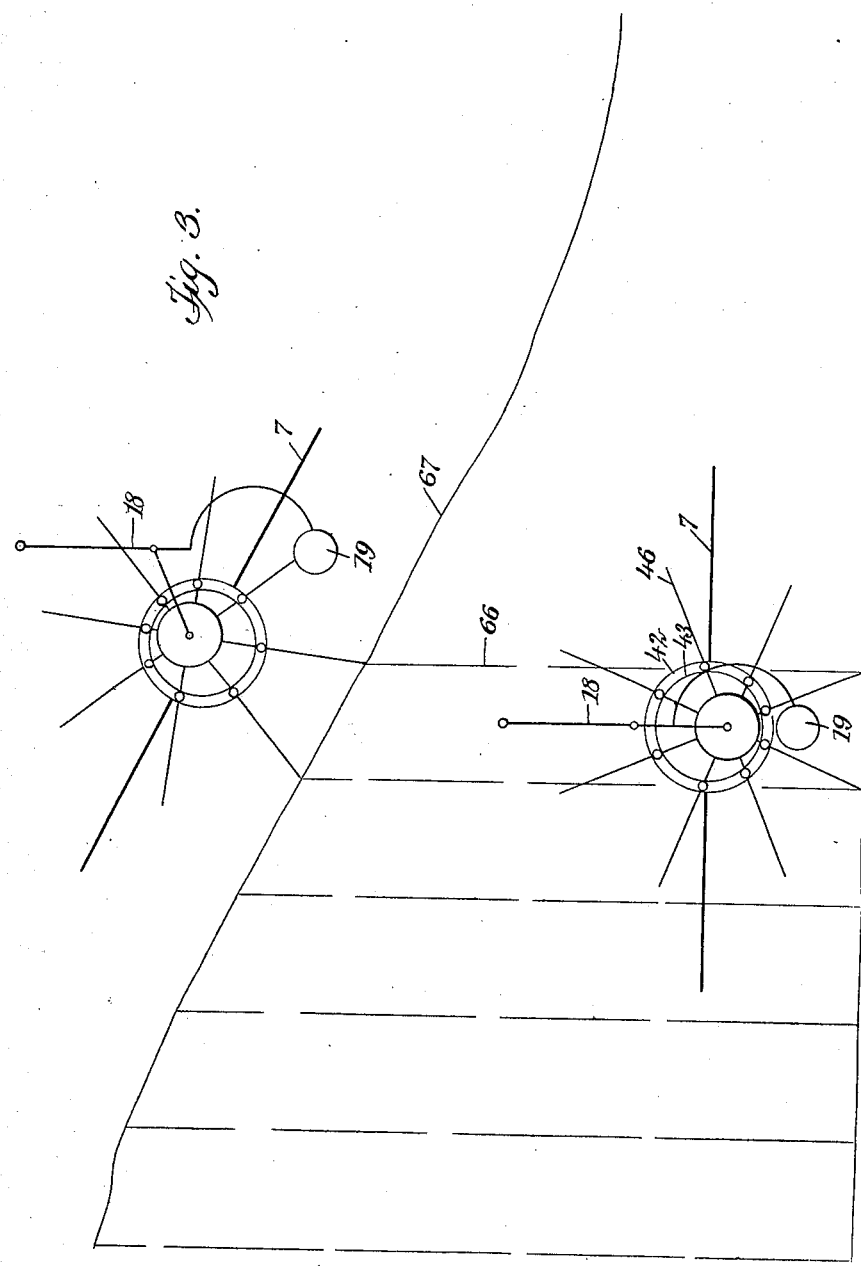

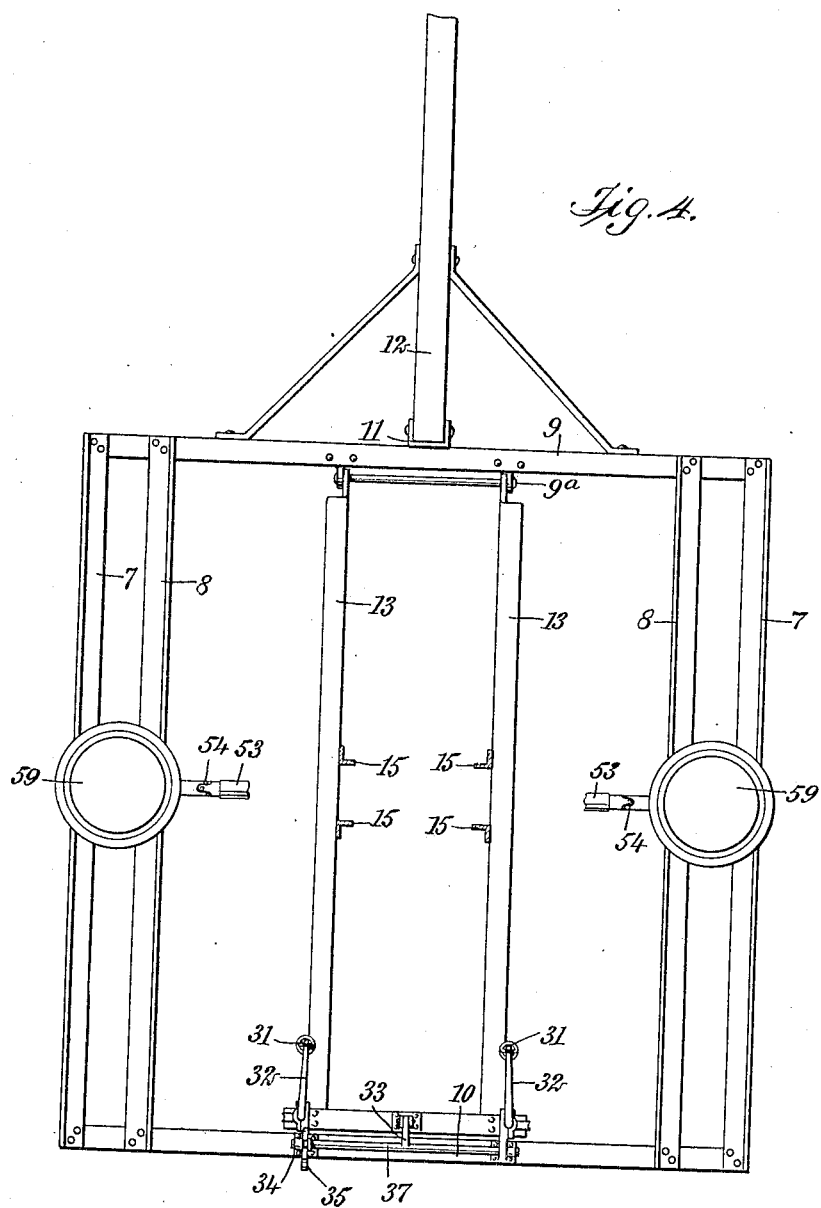

UNITED STATES PATENT OFFICE.

OTTO BROWN, OF MORRISON, IOWA.

CHECK-ROW PLANTER.

No. 913,466.  Specification of Letters Patent.  Patented Feb. 23, 1909.

Application filed September 16, 1908. Serial No. 453,220.

*To all whom it may concern:*

Be it known that I, OTTO BROWN, a citizen of the United States, and a resident of Morrison, in the county of Grundy and State of Iowa, have invented a new and Improved Check-Row Planter, of which the following is a full, clear, and exact description.

My invention relates to planters, my more particular purpose being to provide a type of check row planter, in which the spacing apart of the hills in the general direction of travel of the planter is done, without the necessity of a stationary actuating wire.

My invention further relates to the provision in a planter of this kind, of means controllable by the automatic action of the machine for varying the spaces between the hills so as to render the same suitable for land surfaces of varying conformity as the machine passes over such surfaces.

Agriculturists engaged in the cultivation of land are familiar with the desirability of having the rows checked uniformly, that is, spaced apart by distances which are virtually equal. This is a comparatively easy matter where the land is level. When, however, the land embraces knolls, hills and valleys, so that the land surface in some places slopes obliquely upward or downward, or has more or less curvature, the problem of spacing the rows properly becomes much more difficult. Suppose, for instance, that a given field has a few feet of level land lying in a plane which is substantially horizontal, and that immediately adjoining this portion of the field there is a knoll, the surface of which slopes obliquely in relation to the first-mentioned portion of the field. In this case, if a planter be run over all of the land in question and be provided with means for spacing the rows apart by distances apparently equal, it will be found that the spacing of the rows upon the surface of the knoll will be far out of accord with the spacing of the rows upon the level ground, so much so that a row extending toward the knoll and continuing across its surface will be sharply curved. This is because, owing to the convexity of the knoll the distance across it in a direction representing the travel of the planter is considerably greater than the distance across a corresponding width of the field where the land is level.

What I seek to do by my invention is first to make the spaces relatively longer upon those portions of land where the surface is convex or inclined, as compared with those portions where the surface is level; and second to bring under control of the automatic action of the planter the desired variations in the spaces. By doing these two things, I enable the machine to act selectively upon different surfaces of land, in one instance spacing the charges of seed apart by definite uniform distances, and in another instance spacing them apart by distances which vary either abruptly or gradually, and also vary by large or small degrees, as the case may be, the variations depending entirely upon the character of the land passed over by the machine and being to a large extent independent of the immediate attention of the operator.

Reference is to be had to the accompanying drawings forming part of this specification, in which similar characters of reference indicate corresponding parts in all the figures.

Figure 2:
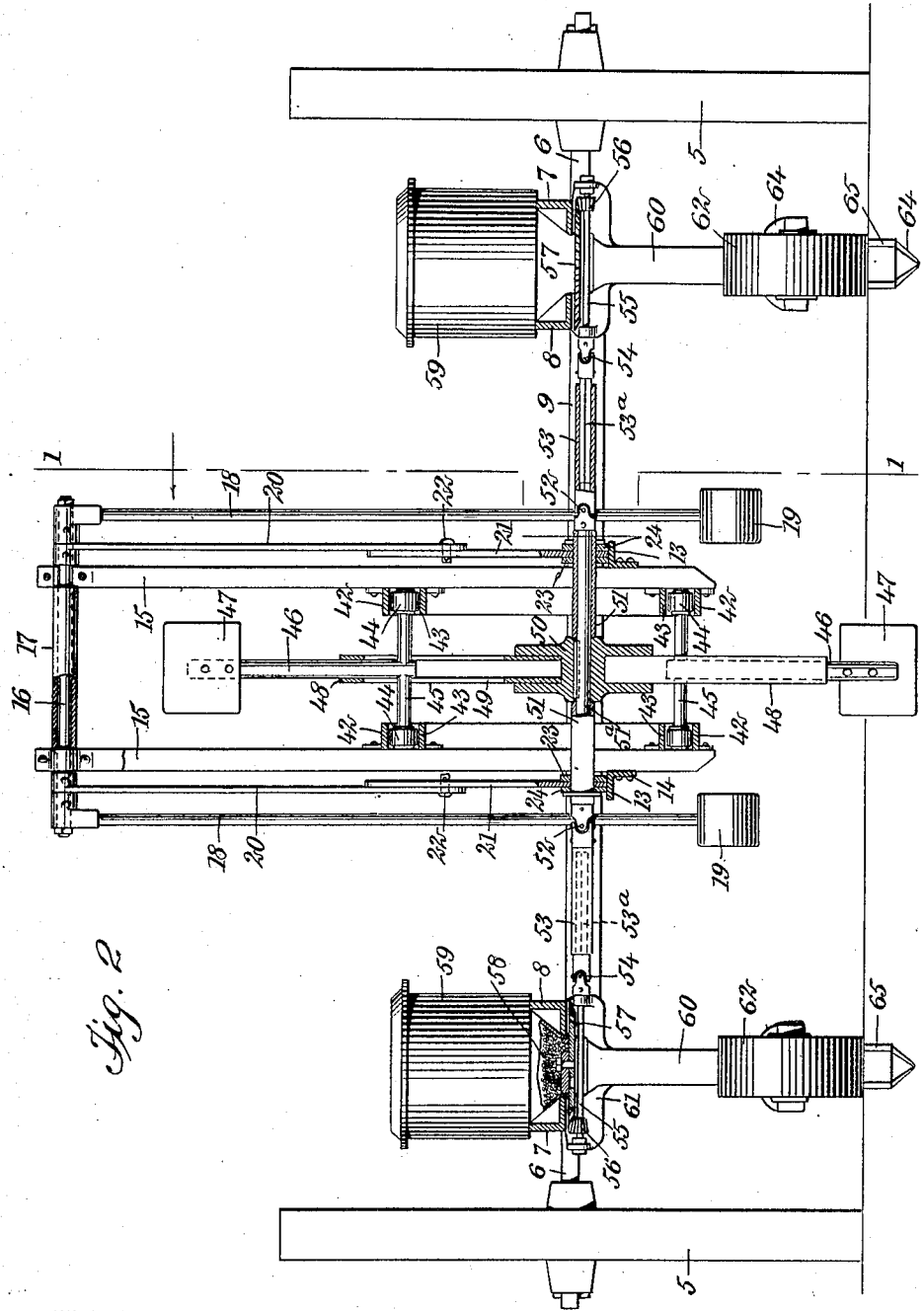

Figure 1 is a substantially vertical section upon the line 1—1 of Fig. 2, looking in the direction of the arrow and showing my improved planter with its seed hoppers and its spacing wheel for controlling the discharge of seed from said hoppers, the spacing wheel being provided with movable members, the virtual length of which is changed, as hereinafter described, as in accordance with the conformity of the land over which the machine travels; Fig. 2 is a vertical section upon the line 2—2 of Fig. 1, looking in the direction of the arrow and showing the construction of the spacing wheel and means including gravity-held pendulums for practically varying certain dimensions of the wheel in order to control its spacing of the hills apart; Fig. 3 is a diagram showing a level portion and a sloping portion of a field, and also showing diagrammatically two of my improved planters at work upon different portions of the field, one of said portions being level and the other sloping relatively to the horizon; and Fig. 4 is a plan view of the general framework of the machine.

At 5—5 are bearing wheels such as are generally employed upon vehicles. They are mounted upon stub shafts 6—6 which extend outwardly from the side beams 7—8, which are made of angle iron and constitute part of the framework shown more particularly in Fig. 4. End beams 9, 10, also of angle iron, support the side beams 7, 8, and are rigid relatively thereto. Mounted upon the end beam 9 is a plate 11 and connected with the latter is a draft beam 12 whereby the machine is drawn over the field by aid of animals.

Two brackets 9ª are mounted upon the end beam 9 and extend obliquely downward therefrom, as will be understood from Fig. 1, and pivotally mounted upon these brackets are supporting beams 13. Secured rigidly upon these supporting means by aid of bolts 14 are standards 15. A rocking shaft 16 is journaled in the tops of these standards and is encircled by a spacing tube 17. Mounted upon the ends of the rocking shaft 16 and rigid in relation to the same are pendulum rods 18 carrying heavy weights 19, the lower portions of the pendulum rods being bent substantially into semicircular form, as indicated in Fig. 1. The pendulum rods and weights together constitute pendulums, which turn the rocking shaft 16 whenever the general framework of the machine is inclined relatively to the horizon in a plane parallel with the planes of the service wheels 5—5.

Mounted rigidly upon the rocking shaft 16 and extending downwardly therefrom are two arms 20, which by the aid of pivot pins 22 are connected with two links 21. Engaging each link 21 are two links 23, 24, provided with a slot 25, 26 of arcuate conformity, and extending through these slots are bolts 27, 28 mounted upon brackets 29, 30, as will be understood from Fig. 1. The bracket 30 is connected with the lower end of a spiral spring 31 which is suspended from a davit hook 32. A rigid arm 33 extends upwardly from the framework and supports the davit hook 32.

Journaled within a bearing 34 carried by the end beam 10 is a stub shaft 37 upon which is mounted a hand lever 35. Associated with this hand lever is a sector 36 provided with notches 36ª by aid of which the hand lever 35 is held in different positions. Mounted upon the stub shaft 37 is an arm 38 and journaled upon the latter is a link 39 which is connected with one end of the supporting beam 13. The tension of the spring 31 is such as to sustain, as far as practicable, the weight of the supporting beam 38 and parts carried thereby. The operator, by moving the hand lever 35, raises and lowers the supporting beams 13 in order to render the planting machinery active as desired. The davit hook 32 is adapted to be adjusted up and down within proper limits, and to facilitate this adjustment I provide rollers 40 mounted in bearings 41. These rollers grip against the lower porton of the hook which is normally held by clamps 32ª, these clamps being loosened in order to allow the hook to be moved.

Mounted upon the standard 15 are rings 42, 43 disposed concentrically. Rollers 44 are disposed intermediate each ring 43 and the corresponding ring 42. The rollers 44 are mounted upon stub shafts 45 and these stub shafts are arranged in pairs mounted upon slide rods 46. The outer ends of the slide rods 46 are provided with anchors or spades 47, having preferably the form of spades, as shown. Each slide rod 46 is mounted within a tube 48, each tube being provided with slots 49 through which the stub shafts 45 extend. A hub 50 supports the tubes 48. These tubes extend radially outward from the hub and constitute slideways for the slide rods 46.

Connected rigidly with the hub 50 are sleeves 51 and extending through these sleeves is a shaft 51ª to which the hub 50 is keyed. The sleeves 51 are connected by universal joints 52 with sleeves 53, and slidably fitting into these sleeves are slide rods 53ª of angular conformation in cross section, the slide rods 53ª being connected by universal joints 54 with shafts 55. There are two of these shafts and each of them is provided with a bevel pinion 56, and meshing with these bevel pinions are bevel gears 57, for the purpose of discharging seed 58 from hoppers 59, each provided with a chute 60 extending downwardly and backwardly therefrom.

A wheel 62 is mounted upon a fork 63 which is journaled upon a pivot pin 61 and trails backwardly from the chute 60, the purpose of the wheel 62 being to close the earth after each charge of seed is deposited. The chute 60 is provided at its bottom with a cutting portion 64 and with an instep 65 to prevent the charge of seed from being displaced or injured after being once dropped and prior to its being covered by aid of the wheel 62.

The rows which cross the general direction of travel of the machine are shown at 66 in Fig. 3. The lower portion of this figure indicates the action of the machine upon level ground, and the upper portion of the figure shows the action upon ground the surface of which is inclined. The line 67 represents a line of demarcation between the level surface indicated in the lower portion of the figure and the hilly surface appearing in the upper portion thereof.

My invention is used as follows: The seeds being placed in the hoppers 59 and the tension of the spring 31 being adjusted if need be, the operator moves the lever 35 so as to raise the chute 60 with its cutting surface 64 entirely clear of the ground. The machine being drawn by animals may now be supported as a vehicle to the field where the work is to be done. The operator, by aid of the hand lever 35, next lowers the supporting beams 13. This brings the cutting surfaces 64 and the chute 60 into engagement with the ground. As the vehicle travels along the ground is thus opened in furrows. By the act of lowering the supporting beams 13, the movable elements of the spacing wheel are also lowered, so that the anchors 47 now engage the ground and preferably penetrate into it a little distance as indicated in Fig. 2. This causes the hub 50 and its accompanying parts to turn, and in so doing they communicate rotary motion to the sleeves 53, the shafts 55, pinions 56, and the gear wheels 57 thus causing the rotary members 57 to liberate charges of seeds from the hoppers 59.

The speed of the gear wheels 57, as compared with the general speed of travel of the entire machine, is controllable by the general positions of the pendulums. When these hang vertically, as indicated in Fig. 1, the rotation of the gear wheels 57 is at its slowest as compared with the speed of the vehicle. Suppose, however, that the machine is traveling up or down an incline. The weights 19 always hang forwardly. The links 21 are lifted by aid of the arms 20 and the adjoining ends of the links 23, 24 are thus slightly raised, the slots 25, 26 with pins 27, 28 extending through them, readily permitting this movement. The hub 50, sleeves 51 and parts immediately connected therewith are thus raised a little distance so that the axis of the hub 50 approaches the geometrical axis of the rings 43, 44. As may be seen from Figs. 1 and 2, if the movement just described were continued sufficiently to bring the axis of the hub 50 into exact alinement with the geometrical axis of the rings 42, 43, the slide rods 46 would all project from the sleeves 48 to the same extent. When, however, the hub 50 is in such position that its axis is below the geometrical axis of the rings, the slide rods 46 are, by the rotation of the hub and its accompanying parts, alternately drawn inwardly and pushed outwardly, and the degree of variation of travel of the slide rods toward and from their common center of rotation is controllable by the pendulums, and consequently by the contour of the surface of the ground over which the machine travels.

As the machine is drawn upon a level portion of the earth, the anchors 47, in digging into the ground at unvarying intervals, cause the seed in the hoppers 59 to be dropped in charges which are equidistant. When, however, the machine comes to a convex or inclined surface, as, for instance, when it ascends a hillside, the spacing of the charges is further apart in the general direction of travel of the vehicle. By properly apportioning the parts it is clear that the spacing may be rendered comparatively uniform regardless of the conformity of the surface upon which the machine is operated.

Having thus described my invention, I claim as new and desire to secure by Letters Patent:

1. The combination of a framework, a pair of rings supported thereby and concentric with each other, a revoluble member journaled upon said framework and provided with portions adapted to engage the ground, said portions being extensible, mechanism connected with these extensible portions, said mechanism being controllable by variations in the contour of the surface of the ground operated upon, and means controllable by movements of said revoluble member for discharging seed.

2. A check row planter, comprising a traveling frame provided with means whereby it is supported upon the ground, mechanism mounted upon said frame and provided with portions for engaging the ground so as to operate said mechanism by the traveling of said frame relatively to the ground, planting mechanism carried by said frame and connected with said last-mentioned mechanism and operated by the same, and mechanism operated by gravity and controllable by the inclination of the ground for regulating the distance apart of the check rows.

3. A device of the character described, comprising a traveling frame provided with means whereby it is supported upon the ground, planting mechanism mounted upon said frame and adapted to discharge seeds, and means operated by gravity and controllable by inclination of the surface over which the frame travels, for regulating the distance apart of the check rows.

4. The combination of a frame movable relatively to the ground to be operated upon, a revoluble member carried by said frame, planting mechanism connected with said revoluble member and operated thereby for the purpose of discharging seeds, and mechanism operated by gravity and controllable by variations in the contour of the surface of the ground, for regulating the distance apart of the check rows.

5. The combination of a frame to be drawn over the ground to be operated upon, planting mechanism mounted upon said frame and adapted to discharge seed, supporting beams mounted upon said frame, mechanism controllable at will for raising and lowering said supporting beams relatively to said frame, standards mounted upon said supporting beams, pendulums journaled upon said standards and depending therefrom so as to be operated by gravity, planting mechanism mounted upon said frame and adapted to discharge seeds, means controllable by the traveling of said frame for actuating said planting mechanism, and a connection from said pendulum to said planting mechanism for bringing the latter under control of the contour of the earth.

In testimony whereof I have signed my name to this specification in the presence of two subscribing witnesses.

OTTO BROWN.

Witnesses:
 ROBT. E. KAUFMAN,
 THOMAS W. COPLEY.